Figure 1:
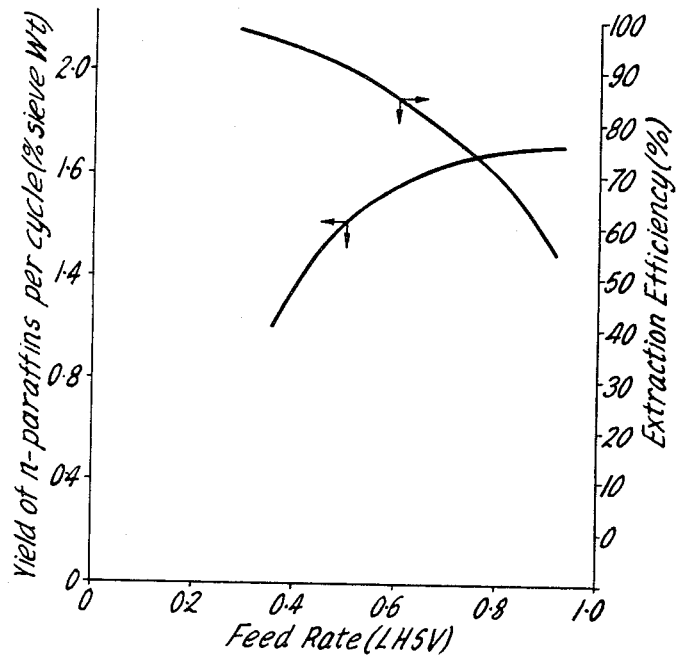

INVENTORS.
CLIVE L. HICKS
ROGER T.L. MOWLL
ROGER H. ANSTEY

United States Patent Office 3,231,631
Patented Jan. 25, 1966

3,231,631
SEPARATION PROCESS
Clive Leonard Hicks, Roger Templeton Lewis Mowll, and Roger Hilary Anstey, Sunbury-on-Thames, England, assignors to The British Petroleum Company, Limited, London, England, a joint-stock corporation of Great Britain
Filed Jan. 21, 1963, Ser. No. 252,653
Claims priority, application Great Britain, Jan. 19, 1962, 2,015/62
4 Claims. (Cl. 260—676)

This invention relates to separation processes for the separation of compounds by their absorption onto molecular sieves and particularly to the separation of straight-chain hydrocarbons from branched-chain and/or cyclic hydrocarbons.

It is well known that certain natural and synthetic zeolites have the property of preferentially absorbing certain types of hydrocarbons. These zeolites, known as molecular sieves, have crystalline structures containing a large number of pores of uniform size. In different zeolites these pores may vary from 4 A. to 15 A. or more in diameter, but in any zeolite the pores will be of substantially uniform size.

It has previously been proposed to treat hydrocarbon mixtures with molecular sieves and it has been proposed to treat petroleum fractions ranging from gasoline to gas-oils and higher with molecular sieves having pore diameters ranging from 4 A. to 15 A. In order to separate straight chain hydrocarbons from branched-chain and/or cyclic hydrocarbons, a molecular sieve having pore diameters of 5 A. is suitable. Such a process may be used to recover a denormalised fraction, for example gasoline of higher octane number due to the removal of low octane normal paraffins. The absorbed straight-chain material may be recovered as a product if desired.

According to the present invention, a process for the recovery of straight-chain hydrocarbons from mixtures of the same with branched-chain and/or cyclic hydrocarbons comprises contacting the mixture with a 5 A. molecular sieve under conditions such that the absorption proceeds with an extraction efficiency of between 70 and 95% and subsequently desorbing the straight-chain hydrocarbons from the molecular sieve.

The extraction efficiency is preferably 70–80% and the process is particularly suitable for separating straight-chain hydrocarbons from petroleum fractions, especially gas-oil fractions, i.e. those boiling within the range 200–450° C., recovery of straight-chain hydrocarbons being effected in a purity of at least 95% by weight.

The extraction efficiency of the absorption step is defined as the percentage of the absorbable components in the feedstock actually absorbed by the sieve. Most separation processes using molecular sieves hitherto suggested have been primarily concerned with the recovery of a product freed from absorbable components, for example the upgrading of naphtha fractions by the removal of n-paraffins therefrom. Operation of this type of process at extraction efficiencies less than the maximum will have an adverse effect upon the purity of the product, so that in the above example the naphtha product recovered would contain n-paraffins. The present invention, however, is directed to processes in which the desired product is the absorbable component, for example the treatment of gas oil fractions for the recovery of a straight-chain paraffin product.

Various processes for separating straight-chain hydrocarbons from mixtures have been suggested and a process particularly suited to the extraction of the present invention is described in our co-pending application Serial No. 168,981 filed January 26, 1962. This process is a three-stage, cyclic, vapour phase process operated isothermally and preferably isobarically in which the feedstock is contacted with the sieve in the first stage to absorb straight-chain hydrocarbons, a purging medium, preferably nitrogen, is contacted with the sieve in the second stage to remove material absorbed on the sieve surface or held interstitially between sieve particles, and the absorbed hydrocarbons are desorbed in the third stage using either n-butane or n-pentane as desorbing medium. The process is operated at a temperature within the range 200–600° C. preferably 300–450° C., and a pressure within the range 0–500 p.s.i.g., preferably 100–300 p.s.i.g. The feedstock to the absorption stage is preferably diluted with a suitable diluent, preferably nitrogen.

It has hitherto been assumed that, in order to recover the maximum yield of straight-chain hydrocarbons, it is necessary to operate at maximum extraction efficiency. Where the criterion is maximum yield of straight-chain product per unit quantity of feedstock this is of course true. However, in a practical process for the recovery of straight-chain hydrocarbons, the criterion is maximum yield of product per unit of time and, surprisingly, it has been found that by operating at extraction efficiencies below the maximum increased yields of product per unit of time can be obtained. The extraction efficiency cannot, however, be reduced indefinitely with advantage as the rate at which feedstock has to be fed to the sieve increases excessively, with consequent excessive wastage and demands on the plant design capacity, while the rate of increase of yield progressively drops off. There is therefore an optimum range of extraction efficiencies.

Extraction efficiencies less than the maximum are obtained by overfeeding the sieve during the absorption stage, i.e. by using a higher space velocity. By operating in this manner, the full absorption capacity of the sieve is utilised whereas in order to operate at maximum extraction efficiency, i.e. to remove 100% of the absorbable component from the feedstock, a proportion of the sieve is not utilised. The optimum range of extraction efficiency has been found to be 70–95% of the maximum, when a high yield of product is obtained without requiring an excessive amount of feedstock.

The invention is illustrated by means of the following example:

A gas-oil fraction boiling within the range 220–340° C. was treated with a 5 A. molecular sieve in an isothermal and isobaric three-stage process comprising absorption, purging and desorption stages, various feed rates to the absorption stage being employed. The temperature and pressure throughout were 380° C. and 125 p.s.i.g., nitrogen at 120 GHSV was used as purging medium and n-pentane at 1.0 LHSV as desorbing medium. The duration of the absorption, purging and desorption stages were 6, 6 and 12 minutes respectively.

The effect of the varying feed rate to the absorption stage on the yield of n-paraffins per cycle and on the extraction efficiency is shown in the accompanying FIG. 1. As shown in FIGURE 1, an extraction efficiency of between 70 and 90% is obtained when the feed rate is in the range of 0.5 to 0.8 LHSV.

In FIG. 1, the upper curve represents the decrease in extraction efficiency with increasing feed rate. The lower curve represents the increase in yield with increasing feed rate.

Figure 2:
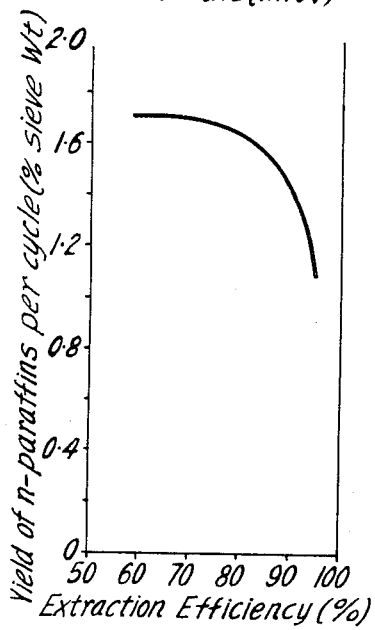

In FIG. 2 the relationship between yield and extraction efficiency is shown as calculated from the curves in FIG. 1. It is seen that with an extraction efficiency of less than 70%, substantially no increase in yield is obtained although considerably more feed is passed to the sieve. Again, with an extraction efficiency of more than 95% the yield decreases rapidly.

We claim:
1. A process for the recovery of straight chain hydrocarbons from mixtures of the same with branched chain and cyclic hydrocarbons comprising contacting the mixture with a 5 A. molecular sieve at a feed rate within the range 0.5 to 0.8 LHSV and adjusting the feed rate within said range so that the absorption proceeds with an extraction efficiency of between 70 and 90%, and subsequently desorbing the straight chain hydrocarbons from the sieve.

2. A process as claimed in claim 1 wherein the feedstock mixture comprises a petroleum fraction boiling within the range 200–450° C.

3. A process as claimed in claim 1 wherein the straight-chain hydrocarbon product is recovered in a purity of 95% by weight or more.

4. A process as claimed in claim 1 wherein the absorption is conducted with an extraction efficiency of 70–80%.

References Cited by the Examiner
UNITED STATES PATENTS

| | | | |
|---|---|---|---|
| 2,859,256 | 11/1958 | Hess et al. | 260—676 |
| 3,081,255 | 3/1963 | Hess et al. | 260—676 |

ALPHONSO D. SULLIVAN, *Primary Examiner.*